July 10, 1923.
J. S. COX
1,461,110
MEANS FOR PREVENTING FROST ON TREES AND THE LIKE
Filed June 6, 1922
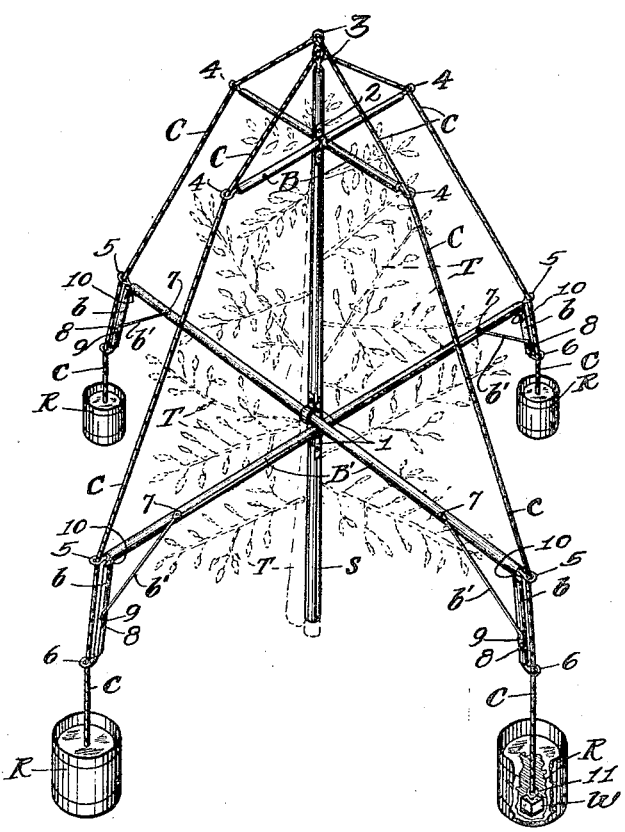
INVENTOR.
James S. Cox,
BY
ATTORNEYS.

Patented July 10, 1923.

1,461,110

UNITED STATES PATENT OFFICE.

JAMES S. COX, OF LOS ANGELES, CALIFORNIA.

MEANS FOR PREVENTING FROST ON TREES AND THE LIKE.

Application filed June 6, 1922. Serial No. 566,420.

*To all whom it may concern:*

Be it known that I, JAMES S. COX, a citizen of the United States, and a resident of Los Angeles, in the county of Los Angeles and State of California, have invented certain new and useful Improvements in Means for Preventing Frost on Trees and the like, of which the following is a specification.

This invention relates to and has for a primary object the provision of an improved means for preventing the accumulation of frost on trees, fruit, plants or shrubbery, and embraces the provision of individual frost prevention units for each of the trees of an orchard, including a skeleton frame adapted to be supported in and around the trees, whereby absorbent elements such as cotton or fibre rope may be stretched over and extended downwardly from the tops of the trees to the ground at a plurality of points, and their lower ends submerged in water contained in suitable receptacles, whereby said elements may be kept moist by capillary attraction.

My improved means is based on the laws of physics, that moisture attracts moisture, and it is well known that frost occurs only when the air is still and contains a certain amount of moisture, when the temperature is sufficiently low. The object therefore of my improved means, is to provide a plurality of moisture zones around and over each of the trees in an orchard, whereby the moisture in the atmosphere will be attracted and caused to settle on artificial elements of absorbent character around rather than on the trees.

Another object is to provide a suitable frame work of skeleton character for holding the moisture collecting elements in proper position and in spaced relation.

Other objects may appear as the description progresses.

In the single figure of the accompanying drawing, I have shown a perspective view of one of the units of my improved system shown in full lines, and with a tree around which said unit is placed, shown in broken lines.

In said drawing I have shown a preferred form of structure which is capable of modification within the scope of the appended claims without departing from the spirit of my invention.

As shown, each of the units of my system includes a central standard S, preferably of wood, and of light weight, adapted to be positioned as near to the trunk of a tree T, as possible. The upper end of the standard S extends substantially above the uppermost branches of the tree T and at a point slightly below said upper end I provide a pair or more of cross-arms B, B, arranged at suitable angles with respect to each other, and extended substantially radially from the trunk of the tree. Said arms are held in in straps or hangers 2 carried on the standard S, and the outer ends of the arms are provided with eye-screws or the like, as at 4, 4, etc., for purposes hereinafter described.

The upper end of standard S has a pair or more of eye-screws 3 for receiving moisture collecting elements such as rope or the like, as at C, C, etc., and the elements C, C, etc., extend downwardly on opposite sides of the standards S through the eye-screws 4, 4, etc., on the cross-arms B, B. Substantially below the cross-arms B, B, I provide other cross-arms of substantially greater length, as at B', B', which are held on the standard S by means of brackets or hangers 1, and said arms are extended at angles relative to each other so that their outer extremities are beyond the outermost branches of the tree T.

The arms B', B', may have depending extensions, *b, b*, etc., hinged to the outer ends of the cross arms at points 10, 10, etc., and braced to said cross-arms by means of braces *b', b'*, etc. The braces *b', b'*, etc., are hingedly connected to the cross-arms B', B', at points 7, 7, etc., inwardly of the ends of the cross-arms and the outer ends 8, 8, etc., of said braces are bent so as to be inserted and held in eye-screws 9, 9, etc., carried on the extensions *b, b*, etc. The outer ends of the lower cross-arms B', B', have eye-screws 5, 5, etc., thereon for receiving the moisture collecting elements C, C, etc., and the lower ends of the arm extensions *b, b*, also have eye-screws 6, 6, etc., thereon through which they are extended downwardly.

A plurality of buckets or receptacles R, R, etc., are provided at spaced points around the tree T and are adapted to hold a sufficient quantity of water in which the lower ends of the moisture collecting elements C, C, etc., are submerged, and said elements C, C, etc., are provided with weights as at W, and their lower ends with eyes as at 11, to which the ends of said elements are attached. Thus, the weights W serve to hold the ends of the collecting elements C, C, etc., submerged in the water of the receptacles R, R, etc., at all times.

The extensions b, b, etc., on the lowermost cross-arms when extended as shown, and held by braces b', b', serve to hold the members C, C, etc., outwardly and out of contact with the branches of the tree T.

Now, it will be seen that I may provide as many units of the arms B, B, and B', B', as may be necessary to support the elements C, C, etc., in position outwardly and over the tree T, and each set of arms may include as many of the cross members as may be necessary, corresponding to the number of elements C, C, etc., employed for accomplishing the objects of my invention.

Now, in operation the structure as shown and described is readily dis-assembled and assembled for use, and standard S is placed inwardly of the tree and as close to the trunk as possible in an upright position. Thereafter, the arms B, B, and B', B', are inserted in the brackets 2 and 1 respectively, and the moisture collecting elements C, C, etc., are extended through the eyes 3 on the upper end of the standards, the eyes 4, 4, etc., on the arms B, B, and the eyes 5, 5, etc., and 6, 6, etc., on the arms B', B', so that their lower ends rest near the bottoms of the receptacles R, R.

Thus, when each of the units is assembled, a certain amount of the water in the receptacles R, R, will by capillary attraction ascend the elements C, C, etc., after the fashion of a wick in an oil lamp, and said elements will thereby be moistened throughout a major portion, if not quite all, of their length.

Now, I have found by experiments and a demonstration of the device as shown and described, that the moisture on the elements C, C, serves to attract the moisture from the atmosphere and prevents the settling of the moisture from the atmosphere on the leaves and branches of the tree, and when the quantity of moisture on the elements C, C, accumulates to the extent that it can not be absorbed by said elements, that is to say, when the point of saturation is reached or exceeded, the excess quantity of the moisture will flow downwardly over the elements C into the receptacle R.

Now, from the fact, first, that moisture is prevented from settling on the trees by the means described, and from the further fact that the excess moisture collected from the atmosphere by the elements C is moved by gravity over said elements into receptacles R, it will be seen that while a certain quantity of frost may accumulate on the elements C, due to the moisture thereon, a certain amount, in not a substantial amount, of the moisture thus accumulated will be in motion and will not be subjected to the freezing action of the temperature to which the moisture on the trees would ordinarily be subjected. In other words, if there is moisture in the air and the air is in circulation, frost usually does not occur, and for this same reason, due to the fact that while a certain amount of the moisture on the elements C will be in motion or circulation downwardly thereover, it is possible that the major portion of the moisture will be deposited in the receptacles R and will not frost.

What I claim is:

1. A frost prevention device for orchards and the like which includes a frame separate from the tree, a plurality of moisture collecting elements supported on said frame and extending from the top to the bottom of the tree at spaced points.

2. A frost prevention device for orchards including a skeleton frame work having a plurality of cross-arms with their ends extended outwardly over a tree, and a plurality of absorbent moisture collecting elements held on said cross-arms, as described.

3. A frost prevention device for orchards including a skeleton frame work having a plurality of cross-arms with their ends extended outwardly over a tree, and a plurality of absorbent moisture collecting elements held on said cross-arms, the lower ends of said moisture collecting elements being submerged in water, for the purpose described.

4. A frost prevention device for orchards including a skeleton frame-work having a plurality of cross-arms with their ends extended outwardly over a tree, a plurality of absorbent moisture collecting elements held on said cross-arms, the lower ends of said moisture collecting elements being submerged in water, and means for maintaining a sufficient quantity of water at the base of the tree for submerging the ends of said collecting elements.

5. A frost prevention device for orchards including a skeleton frame-work having a plurality of cross-arms with their ends extended outwardly over a tree, a plurality of absorbent moisture collecting elements held on said cross-arms, the lower ends of said moisture collecting elements being submerged in water, means for maintaining a sufficient quantity of water at the base of the tree for submerging the ends of said collecting elements, and means on the ends of said collecting elements for holding the same submerged in the water.

6. A frost prevention device for orchards and the like comprising a standard, a plurality of sets of relatively angularly disposed cross-arms mounted on said standard and having their ends extended outwardly of the tree at different heights, a plurality of receptacles arranged around and at the base of the tree for holding quantities of water, and a plurality of absorbent moisture collecting elements held on the ends of said cross-arms outwardly of the tree, and having portions thereof submerged in the water of said receptacles.

JAMES S. COX.

Witnesses:
 VINCENT B. O'CONNOR,
 IRENE BREEN.